Nov. 17, 1942.  L. I. PICKERT  2,302,377

AIR BRAKE

Filed April 1, 1942

Inventor
Lynn I. Pickert

By
Dodge * *

Attorneys

Patented Nov. 17, 1942

2,302,377

UNITED STATES PATENT OFFICE 2,302,377

AIR BRAKE

Lynn I. Pickert, Watertown, N. Y., assignor to The New York Air Brake Company, a corporation of New Jersey Application April 1, 1942, Serial No. 437,256

8 Claims. (Cl. 303—68)

This invention relates to release valves primarily intended for use in releasing the brakes on cars preparatory to setting them out of a train for switching. The device can also be used to release stuck brakes.

The important features of the invention are that the device can readily be interposed between a brake controlling valve device (control valve or triple valve) and the brake cylinder without requiring any change in the construction of either. Further, the operation of the device entails no waste of air other than the air in the brake cylinder at the time the application is released by the release valve.

The invention is in the nature of an improvement on the devices described and claimed in the patents to Baker et al., No. 2,287,775, dated June 30, 1942, and Sudduth, No. 2,293,778, dated August 25, 1942, each assigned to The New York Air Brake Company.

The release valve is operable only while a brake application is in effect. When operated, the release valve not only vents the brake cylinder but it prevents any further supply of air from the reservoir or reservoirs associated with the brake controlling valve device to the brake cylinder, until the brake controlling valve device has itself shifted to release position. At that time the release valve is automatically restored and cannot again be operated until the brake cylinder is under pressure.

If a train comes into a yard and stops with a brake application, for example, a service application, the first step is for the switchman to operate the release valve on a car that is to be cut out for switching. The effect of this is to vent the brake cylinder on that car and seal the charge of air in the reservoir or reservoirs on that car. The next step is to cut the car out of the train. This entails venting of the brake pipe so that the brake controlling valve device moves to emergency position. However, such motion is functionless because no air can be delivered to the brake cylinder. After the car has been switched and is reconnected in a train, the restoration of brake pipe pressure during release will cause the brake controlling valve device on this car to move to release position. When it does, the release valve will automatically resume its normal position without entailing any loss of reservoir air.

It is the practice with present day equipment to observe the cars on a train leaving a terminal to see whether any car has stuck brakes. If the brakes on any car are stuck it is the practice to operate its reservoir bleed valve to cause the triple valve on that car to move to release position. This is a wasteful procedure and unsatisfactory because the triple valve is likely to stick after the next application.

The present invention can be used to release a stuck brake. If any car is observed to have stuck brakes the operation of the release valve will vent the brake cylinder on that car and disconnect that brake cylinder from the triple valve or other controlling valve device. This entails no movement of the brake controlling valve device so if this remains stuck, the valve on that car simply remains cut out. On the other hand, if the brake controlling valve device should move to release position, the brake on that car will automatically be restored to active condition.

A preferred embodiment of the invention will now be described with reference to the accompanying drawing, in which.

Figure 1:
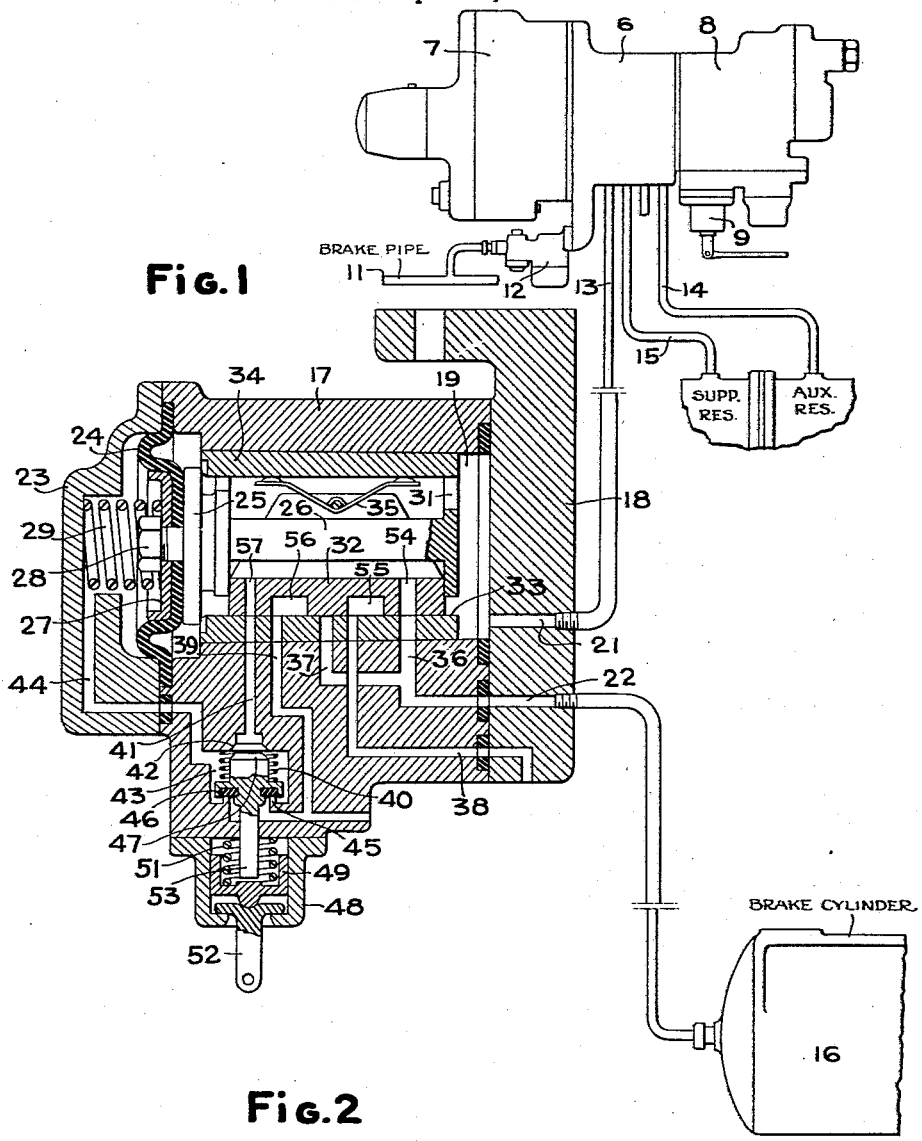
Fig. 1 is a sectional view of the release valve diagrammed as connected to an AB brake valve and to a brake cylinder each drawn in miniature to save space, and at the same time indicate the essential connections.

Referring first to Fig. 1, 6 represents the pipe bracket of the AB valve, 7 represents the body of the emergency portion, and 8 represents the body of the service portion. The mechanism indicated at 9 is the well-known reservoir bleed valve. The brake pipe appears at 11 and has a branch which leads through the dust collector 12 to the pipe bracket. The brake cylinder connection appears at 13; the auxiliary reservoir connection at 14; and the supplemental reservoir connection at 15. Fragments of the two reservoirs appear in the drawing where they are indicated by legends. A portion of the brake cylinder appears at 16.

The parts so far described are of ordinary standard construction. The AB brake is now standard on American railroads and requires no detailed description.

Interposed between the brake cylinder connection 13 and the brake cylinder 16 is the release valve forming the subject of the present invention. The valve housing 17 is supported on a pipe bracket 18 and encloses a slide valve chamber 19 and a number of ports which will hereafter be described in detail.

A port 21 in the bracket 18 is connected to the brake cylinder connection 13 and another port 22 in the pipe bracket is connected to the brake cylinder 16 so that the release valve is interposed in the path of flow between the brake cylinder connection of the brake controlling valve device and the brake cylinder. The passage 21 leads directly to the slide valve chamber 19. The left end of the housing 17 is closed by a cap 23 which clamps at its periphery a flexible slack diaphragm 24. This diaphragm is clamped at its center between a hub 25 on the outer end of valve stem 26 and a clamping disc 27 by means of a nut 28 threaded on an extension of the stem 26.

A coil compression spring 29 reacts between the cap 23 and the disc 27 and urges the stem 26 to the right. The stem 26 is guided at its right hand end by a spider 31 and the stem 26 straddles and actuates without lost motion a slide valve 32 which works on a seat 33 formed in the slide valve chamber bushing 34. The bow spring 35, of familiar form, holds the slide valve 32 to its seat. The slide valve seat has two ports 36 and 37 which are in free communication with the connection 22 leading to the brake cylinder. Between these two ports is an atmospheric exhaust port 38. To the left of the port 37, as viewed in Fig. 1, is a second atmospheric exhaust port 39 and to the left of exhaust port 39 is a port 41 which leads past a valve seat 42 to a valve chamber 43. This chamber 43 is connected by a passage 44 with a space on the outer side, that is, to the left of the diaphragm 24. On the lower portion of the chamber 43 is a seat 45 surrounding a passage which leads to the atmosphere. Mounted in the valve chamber 43 is a double beat valve. This has a rubber faced valve portion 46 which seats downward on the atmospheric seat 45 and at its upper end a conical valve head 47 which seats upward against the valve seat 42 so as to control the port 41. The valve is urged downward by the coil compression spring 48.

Mounted in a cap 48 is a slide member or plunger 49 which is urged downward by a coil compression spring 51. Beneath the slide 49 is a tilting actuator 52 which when tilted forces the slide 49 upward to collide with the stem 53 of the double beat valve just described. When this occurs, the port 41 is blanked and the space to the left of the diaphragm 24 is freely vented to atmosphere. This causes the diaphragm to move the valve stem 26 to the left and positions the valve 32, as indicated in Fig. 2.

Figure 2:
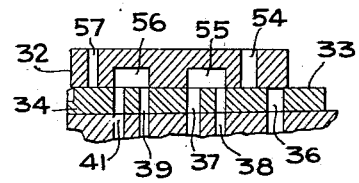
Fig. 2 is a view of the slide valve and seat of the release valve in releasing position.

Figure 1 shows normal position, and Fig. 2 shows releasing position.

The porting of the valve 32 is as follows:

There is a through port 54 which in normal position registers with the port 36 in the seat and inventing position is blanked at the seat. There is a cavity 55 which is functionless in normal poistion and in venting position connects the brake cylinder port 37 with the atmospheric exhaust port 38. There is a second cavity 56 which in normal position is functionless and in venting position connects the port 41 with the atmospheric exhaust port 39. There is a through port 57 which in normal position registers with the port 41 and in venting position is blanked at the seat.

Assume now that the train is running with the brakes released. The brake controlling valve device will vent the passage 21 to the atmosphere through the ordinary exhaust path. The space to the left of diaphragm 24 is in free communication with the slide valve chamber by way of passage 44, and ports 41 and 57. Thus the spring 29 holds the slide valve 33 in its normal right hand position as in Fig. 1. If a brake application be made, brake cylinder pressure develops in the slide valve chamber 19 and by way of ports 57, 41, 44 it develops substantially as rapidly in the space to the left of diaphragm 24. There is free communication by way of ports 54 and 36 from the slide valve chamber to the brake cylinder. It follows that the brakes may be applied and released without any interference by the releasing valve. It is also apparent that the releasing valve cannot be actuated unless the brake cylinder is under pressure.

Assume that a train is brought in and that a service or emergency application has brought the train to rest. Assume further that a car equipped with a release valve as indicated in Figure 1 is to be cut out. The brakeman tilts the actuator 52, thus unseating the vent valve 46 and seating the intercepting valve 47 against the seat 42. The effect is to disconnect the space to the left of the diaphragm 24 from the slide valve chamber 19 and vent that space to atmosphere. Brake cylinder pressure being effective in the slide valve chamber, the diaphragm 24 is immediately forced to the left over-powering spring 29 and shifting the slide valve 32 to venting position, shown in Fig. 2. Cavity 55 assures continued venting of the brake cylinder while the blanking of the port 36 by the slide valve prevents any further flow of air to the brake cylinder. Similarly the port 41 is cut off from the slide valve chamber and connected by the cavity 56 to atmospheric exhaust 39. Thus, the manipulation of the actuator 52 need be only very brief for as soon as the diaphragm 24 has shifted to the left, release of the actuator 52 and the descent of the valve 46, 47 will not re-establish pressure at the left of the diaphragm 24. It follows that the brake cylinder is vented to atmosphere and the brake cylinder connection 13 of the brake controlling valve device is effectively blanked so that no further air can be drawn from either reservoir on that car.

If the car be cut out of the train and its brake pipe 11 be vented, the brake controlling valve device will shift to emergency position if not already there, but this entails no loss of air from the reservoirs. The release valve will stay in its venting position indefinitely until pressure in the brake pipe 11 is restored sufficiently to move the brake controlling valve device to brake releasing position. When this occurs, the chamber 19 will be vented by flow through connection 21 and brake cylinder connection 13 to the exhaust path of the brake controlling valve device. This will permit the spring 29 to restore the slide valve 33 to its normal position (Fig. 1).

The same sequence of events will occur if the device is manipulated to release a stuck brake. It is important to observe that the motive energy for actuating the valve is derived from brake cylinder air; that the device can be operated only while an application is in effect, and that the effect of its actuation is to vent the brake cylinder and conserve the reservoir charges. It is important to observe also that the valve 32 is held seated by brake cylinder pressure which is active in the slide valve chamber 19.

The embodiment chosen for illustration was selected because of its simplicity and safety. Various modifications can be made involving the use of different types of valve or different porting arrangements. A piston could be substituted for the diaphragm.

The use of the double beat valve 46 and 47 with actuator 12 is a convenient way of shifting the valve to releasing position, but it must be remembered that spring 29 alone opposes the shift and that near completion of the shift, the device becomes self-retaining. Hence any means (manual or other) to shift the valve to releasing position may be used within the broad scope of the invention.

Further, while the release valve is shown mounted on a separate bracket, it can of course be attached to, or incorporated in, the pipe bracket 6 without the exercise of invention.

Consequently except to the extent specified in the claims, no limitation to the specific structure herein illustrated is implied.

I claim:

1. A release valve mechanism for interposition between the brake cylinder connection of a brake controlling valve device and its brake cylinder, said mechanism comprising in combination valve means having a first position in which it connects the brake cylinder connection with the brake cylinder, and a second position in which it seals said connection and vents the cylinder; means effective at least when the brake cylinder connection is under pressure to bias said valve means to the first-named position; pressure operated motor means capable, when charged, of overcoming said bias and shifting said valve means to the second position, and arranged to be charged when the brake cylinder connection is under pressure; and a manually operated valve having a normal position in which it inhibits operation of said pressure operated motor irrespective of its state of charge, and an abnormal position to which it may be manually shifted and in which it renders said motor active to overcome said bias.

2. A release valve mechanism for interposition between the brake cylinder connection of a brake controlling valve device and its brake cylinder, said mechanism comprising in combination valve means having a first position in which it connects the brake cylinder connection with the brake cylinder, and a second position in which it seals said connection and vents the cylinder; means effective at least when the brake cylinder connection is under pressure to bias said valve means to the first-named position; pressure operated motor means capable, when charged, of overcoming said bias and shifting said valve means to the second position, and arranged to be charged when the brake cylinder connection is under pressure; a manually operated valve having a normal position in which it inhibits operation of said motor irrespective of its state of charge, and an abnormal position in which it renders said motor active to overcome said bias; yielding means urging the last named valve to its normal position; and means rendered active by the shift of said motor in overcoming said bias, to retain said motor in shifted position.

3. A release valve mechanism for interposition between a control valve and a brake cylinder whose pressure is normally controlled thereby, said mechanism comprising an expansible chamber motor having two working spaces separated by a movable abutment, the first working space being subject to braking pressures developed by the control valve; yielding means insufficient to resist effective braking pressure in the first working space and serving to bias the abutment toward said space; valve means actuated by said abutment and serving to connect said spaces freely when the abutment is in said biased position, and isolate them and vent the second working space when the abutment is moved from said biased position; means operable to vent the second working space; and valve means controlled by said abutment effective in the biased position thereof to connect the control valve and cylinder, and effective when said bias is overcome to disconnect the control valve from the brake cylinder and vent the brake cylinder.

4. A release valve mechanism for interposition between a control valve and a brake cylinder whose pressure is normally controlled thereby, said mechanism comprising an expansible chamber motor having two working spaces separated by a movable abutment, the first working space being subject to braking pressures developed by the control valve; yielding means insufficient to resist effective braking pressure in the first working space and serving to bias the abutment toward said space; valve means actuated by said abutment and serving to connect said spaces freely when the abutment is in said biased position, and isolate them and vent the second working space when the abutment is moved from said biased position; means operable to vent the second working space; valve means controlled by said abutment effective in the biased position thereof to connect the control valve and cylinder, and effective when said bias is overcome to disconnect the control valve from the brake cylinder and vent the brake cylinder; and manually operable means for venting the second working space.

5. A release valve mechanism for interposition between a control valve and a brake cylinder whose pressure is normally controlled thereby, said mechanism comprising an expansible chamber motor having two working spaces separated by a movable abutment, the first working space being subject to braking pressures developed by the control valve; valve means connected with said abutment to be shifted between two positions by reverse movements of the abutment, namely a normal position assumed when the abutment is shifted toward the first working space and in which the valve means connects the brake cylinder and the control valve and also connects the two working spaces, and an abnormal position in which the valve means interrupts the two connections just mentioned and vents the brake cylinder and the second working space; yielding means insufficient to resist effective braking pressure in the first working space and biasing the abutment toward the first working space to position the valve means in normal position; and manually operable means for venting the second working space.

6. A release valve mechanism for interposition between a control valve and a brake cylinder whose pressure is normally controlled thereby, said mechanism comprising an expansible chamber motor having two working spaces separated by a movable abutment, the first working space being subject to braking pressures developed by the control valve; valve means connected with said abutment to be shifted between two positions by reverse movements of the abutment, namely a normal position assumed when the abutment is shifted toward the first working space and in which the valve means connects the brake cylinder and the control valve and also connects the two working spaces, and an abnormal position in which the valve means interrupts the two connections just mentioned and vents the brake cylinder and the second working space; yielding means insufficient to resist effective braking pressure in the first working space and biasing the abutment toward the first working space to position the valve means in normal position; manually operable valve means movable from a normal inactive position to an active position in which it vents the second working space while inhibiting flow thereto from the first working space; and means biasing said manually operable valve means to said inactive position.

7. A release valve mechanism for interposition between a control valve and a brake cylinder whose pressure is normally controlled thereby, said mechanism comprising an expansible chamber motor having two working spaces separated by a movable abutment, the first working space being subject to braking pressures developed by the control valve; valve means connected with said abutment to be shifted between two positions by reverse movements of the abutment, namely a normal position assumed when the abutment is shifted toward the first working space and in which the valve means connects the brake cylinder and the control valve and also connects the two working spaces, and an abnormal position in which the valve means interrupts the two connections just mentioned and vents the brake cylinder and the second working space; yielding means insufficient to resist effective braking pressure in the first working space and biasing the abutment toward the first working space to position the valve means in normal position; and manually operable means for effecting a shift of said valve means to abnormal position.

8. A self-restoring releasing mechanism for interposition between the brake cylinder connection of a brake controlling valve device and the brake cylinder connected therewith, said mechanism comprising a releasing valve having a normal position in which it connects the brake cylinder in normal communication with the brake controlling valve device, and an abnormal position to which it may be shifted and in which it isolates and vents the brake cylinder; yielding means urging said valve to said normal position; a normally inert pressure motor serving when energized to hold said releasing valve in abnormal position against the urge of said biasing means; and valve means associated with said releasing valve and serving in said abnormal position to energize said motor with pressure fluid derived from the brake cylinder connection of said brake controlling valve device.

LYNN I. PICKERT.